(12) United States Patent
Hasegawa et al.

(10) Patent No.: US 11,024,888 B2
(45) Date of Patent: Jun. 1, 2021

(54) STACKED BATTERY

(71) Applicant: TOYOTA JIDOSHA KABUSHIKI KAISHA, Toyota (JP)

(72) Inventors: Hajime Hasegawa, Susono (JP); Yuki Matsushita, Atsugi (JP); Hideaki Nishimura, Sunto-gun (JP); Yusuke Okuhata, Susono (JP); Norihiro Ose, Sunto-gun (JP); Mitsuru Tateishi, Susono (JP); Shigetaka Nagamatsu, Mishima (JP); Takayuki Uchiyama, Susono (JP); Shigenori Hama, Sunto-gun (JP); Dai Kato, Susono (JP); Naohiro Mashimo, Susono (JP); Hideyo Ebisuzaki, Toyota (JP); Ayano Kobayashi, Susono (JP); Hisataka Fujimaki, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 130 days.

(21) Appl. No.: 15/952,493

(22) Filed: Apr. 13, 2018

(65) Prior Publication Data

US 2018/0316066 A1  Nov. 1, 2018

(30) Foreign Application Priority Data

Apr. 28, 2017 (JP) .............................. JP2017-090063

(51) Int. Cl.
*H01M 10/04* (2006.01)
*H01M 10/0525* (2010.01)
(Continued)

(52) U.S. Cl.
CPC ....... *H01M 10/4207* (2013.01); *H01M 4/386* (2013.01); *H01M 4/64* (2013.01);
(Continued)

(58) Field of Classification Search
None
See application file for complete search history.

(56) References Cited

U.S. PATENT DOCUMENTS 6,051,341 A    4/2000  Terasaki
2008/0131759 A1*  6/2008  Hosaka ............ H01M 10/0525
                                                429/61
(Continued)

FOREIGN PATENT DOCUMENTS

CN    102511093 A    6/2012
JP    2007-299680 A    11/2007
(Continued)

OTHER PUBLICATIONS

Office Action dated Oct. 10, 2019 issued in U.S. Appl. No. 15/952,332.
(Continued)

*Primary Examiner* — Ula C Ruddock
*Assistant Examiner* — Amanda Rosenbaum
(74) *Attorney, Agent, or Firm* — Sughrue Mion, PLLC

(57) ABSTRACT

A main object of the present disclosure is to provide a stacked battery in which the unevenness of short circuit resistance among a plurality of cells is suppressed. The present disclosure achieves the object by providing a stacked battery comprising: a plurality of cells in a thickness direction, wherein the plurality of cells are electrically connected in parallel; each of the plurality of cells includes a cathode current collector, a cathode active material layer, a solid electrolyte layer, an anode active material layer, and an anode current collector, in this order; the stacked battery includes a surface-side cell that is located on a surface side of the stacked battery, and a center-side cell that is located on a center side rather than the surface-side cell; and the surface-side cell and the center-side cell satisfy at least one of: condition i) an elongation rate of the cathode current collector in the surface-side cell is less than an elongation (Continued)

rate of the cathode current collector in the center-side cell; and condition ii) an elongation rate of the anode current collector in the surface-side cell is less than an elongation rate of the anode current collector in the center-side cell.

10 Claims, 5 Drawing Sheets

(51) Int. Cl.
*H01M 10/0562* (2010.01)
*H01M 10/0585* (2010.01)
*H01M 10/42* (2006.01)
*H01M 4/02* (2006.01)
*H01M 4/38* (2006.01)
*H01M 4/64* (2006.01)

(52) U.S. Cl.
CPC .... *H01M 10/0472* (2013.01); *H01M 10/0525* (2013.01); *H01M 10/0562* (2013.01); *H01M 10/0585* (2013.01); *H01M 2004/027* (2013.01)

(56) References Cited

U.S. PATENT DOCUMENTS

| | | |
|---|---|---|
| 2011/0068294 A1 | 3/2011 | Zaghib et al. |
| 2011/0183166 A1 | 7/2011 | Suga et al. |
| 2012/0175551 A1 | 7/2012 | Watanabe et al. |
| 2014/0065464 A1 | 3/2014 | Masarapu et al. |
| 2014/0178753 A1 | 6/2014 | Chu et al. |
| 2015/0249265 A1 | 9/2015 | Matsumura et al. |
| 2015/0303466 A1* | 10/2015 | Yamamoto ............ C23C 14/352 429/229 |
| 2015/0318555 A1 | 11/2015 | Oku et al. |
| 2015/0380733 A1 | 12/2015 | Lee et al. |
| 2017/0222280 A1 | 8/2017 | Asano et al. |
| 2017/0279113 A1* | 9/2017 | Ohsawa ............ H01M 10/0525 |
| 2017/0358816 A1 | 12/2017 | Sugiura |
| 2018/0031049 A1 | 2/2018 | Heitzenrater |
| 2018/0316048 A1 | 11/2018 | Hasegawa et al. |
| 2018/0316049 A1 | 11/2018 | Hasegawa et al. |
| 2018/0316065 A1 | 11/2018 | Hasegawa et al. |

FOREIGN PATENT DOCUMENTS

| | | | |
|---|---|---|---|
| JP | 2012186034 A | * | 9/2012 |
| JP | 2013-26041 A | | 2/2013 |
| JP | 2016-136490 A | | 7/2016 |
| JP | 2016-207614 A | | 12/2016 |
| KR | 10-2015-0048707 A | | 5/2015 |
| KR | 10-2017-0032902 A | | 3/2017 |
| WO | 2010/046745 A1 | | 4/2010 |
| WO | 2016/051639 A1 | | 4/2016 |

OTHER PUBLICATIONS

Final Office Action dated Mar. 19, 2020 issued in U.S. Appl. No. 15/952,332.
Office Action dated Sep. 17, 2020 issued in U.S. Appl. No. 15/952,332.
U.S. Appl. No. 15/952,332, filed Apr. 13, 2018.

* cited by examiner

STACKED BATTERY

TECHNICAL FIELD

The present disclosure relates to a stacked battery.

BACKGROUND ART

Stacked batteries comprising a plurality of cells in a thickness direction are known; wherein each of the plurality of cells includes a cathode current collector, a cathode active material layer, a solid electrolyte layer, an anode active material layer, and an anode current collector, in this order. For example, Patent Literature 1 discloses a lithium ion secondary battery comprising a plurality of unit cells, wherein each of the plurality of unit cells includes: a cathode layer provided with a cathode current collector and a cathode mixture layer; a solid electrolyte layer; and an anode layer provided with an anode current collector and an anode mixture layer. Further, Patent Literature 1 discloses a nail penetration test as a method for evaluating the safety of all solid batteries.

Also, for example, Patent Literature 2 discloses a method for producing a stacked type all solid battery wherein: the stacked type all solid battery comprises a plurality of all solid battery cells connected in a bipolar form or in a monopolar form; and each of the plurality of all solid battery cells includes a cathode current collector layer, a cathode active material layer, a solid electrolyte layer, an anode active material layer, and an anode current collector layer.

CITATION LIST

Patent Literatures

Patent Literature 1: Japanese Patent Application Laid-Open (JP-A) No. 2016-207614
Patent Literature 2: JP-A No. 2016-136490

SUMMARY OF DISCLOSURE

Technical Problem

As described above, the nail penetration test is known as a method for evaluating the safety of all solid batteries. The nail penetration test is a test of penetrating a conductive nail through an all solid battery, and observing changes (such as a temperature change) when an internal short circuit within the battery occurs.

From detailed studies of the nail penetration test of stacked batteries comprising a plurality of all solid battery cells electrically connected in parallel, the present inventors have acquired new knowledge that the resistance of a short circuit part (short circuit resistance) in each cell varies greatly with the cell location. When a cell with low short circuit resistance and a cell with high short circuit resistance are mixed, a current flows from the cell with high short circuit resistance into the cell with low short circuit resistance. Hereinafter, this may be referred to as a "sneak current". When the sneak current occurs, the temperature of the cell with low short circuit resistance (the cell to which the current flowed into) increases, and as the result, the battery materials are easily deteriorated.

The present disclosure has been made in view of the above circumstances, and a main object thereof is to provide a stacked battery in which the unevenness of short circuit resistance among a plurality of cells is suppressed.

Solution to Problem

In order to achieve the object, the present disclosure provides a stacked battery comprising: a plurality of cells in a thickness direction, wherein the plurality of cells are electrically connected in parallel; each of the plurality of cells includes a cathode current collector, a cathode active material layer, a solid electrolyte layer, an anode active material layer, and an anode current collector, in this order; the stacked battery includes a surface-side cell that is located on a surface side of the stacked battery, and a center-side cell that is located on a center side rather than the surface-side cell; and the surface-side cell and the center-side cell satisfy at least one of: condition i) an elongation rate of the cathode current collector in the surface-side cell is less than an elongation rate of the cathode current collector in the center-side cell; and condition ii) an elongation rate of the anode current collector in the surface-side cell is less than an elongation rate of the anode current collector in the center-side cell.

According to the present disclosure, since the surface-side cell and the center-side cell satisfy at least one of condition i) and condition ii), the unevenness of short circuit resistance among the plurality of cells may be suppressed in the stacked battery.

In the disclosure, when each of the plurality of cells is numbered as a $1^{st}$ cell to a $N^{th}$ cell, in which N≥3, in order along the thickness direction of the stacked battery, the surface-side cell may be a cell that belongs to a cell region A including the $1^{st}$ cell to a $(N/3)^{th}$ cell.

In the disclosure, the center-side cell may be a cell that belongs to a cell region B including a $((N/3)+1)^{th}$ cell to a $(2N/3)^{th}$ cell.

In the disclosure, an average elongation rate of the cathode current collector in the cell region A may be less than an average elongation rate of the cathode current collector in the cell region B.

In the disclosure, an average elongation rate of the anode current collector in the cell region A may be less than an average elongation rate of the anode current collector in the cell region B.

In the disclosure, when each of the plurality of cells is numbered as a $1^{st}$ cell to a $N^{th}$ cell, in which N≥60, in order along the thickness direction of the stacked battery, the surface-side cell may be a cell that belongs to a cell region C including the $1^{st}$ cell to a $20^{th}$ cell.

In the disclosure, the center-side cell may be a cell that belongs to a cell region D including a $21^{st}$ cell to a $40^{th}$ cell.

In the disclosure, an average elongation rate of the cathode current collector in the cell region C may be less than an average elongation rate of the cathode current collector in the cell region D.

In the disclosure, an average elongation rate of the anode current collector in the cell region C may be less than an average elongation rate of the anode current collector in the cell region D.

In the disclosure, the anode active material layer may include Si or a Si alloy as an anode active material.

Advantageous Effects of Disclosure

The stacked battery in the present disclosure effects that an unevenness of short circuit resistance among a plurality of cells is suppressed.

DESCRIPTION OF EMBODIMENTS

Figure 1:
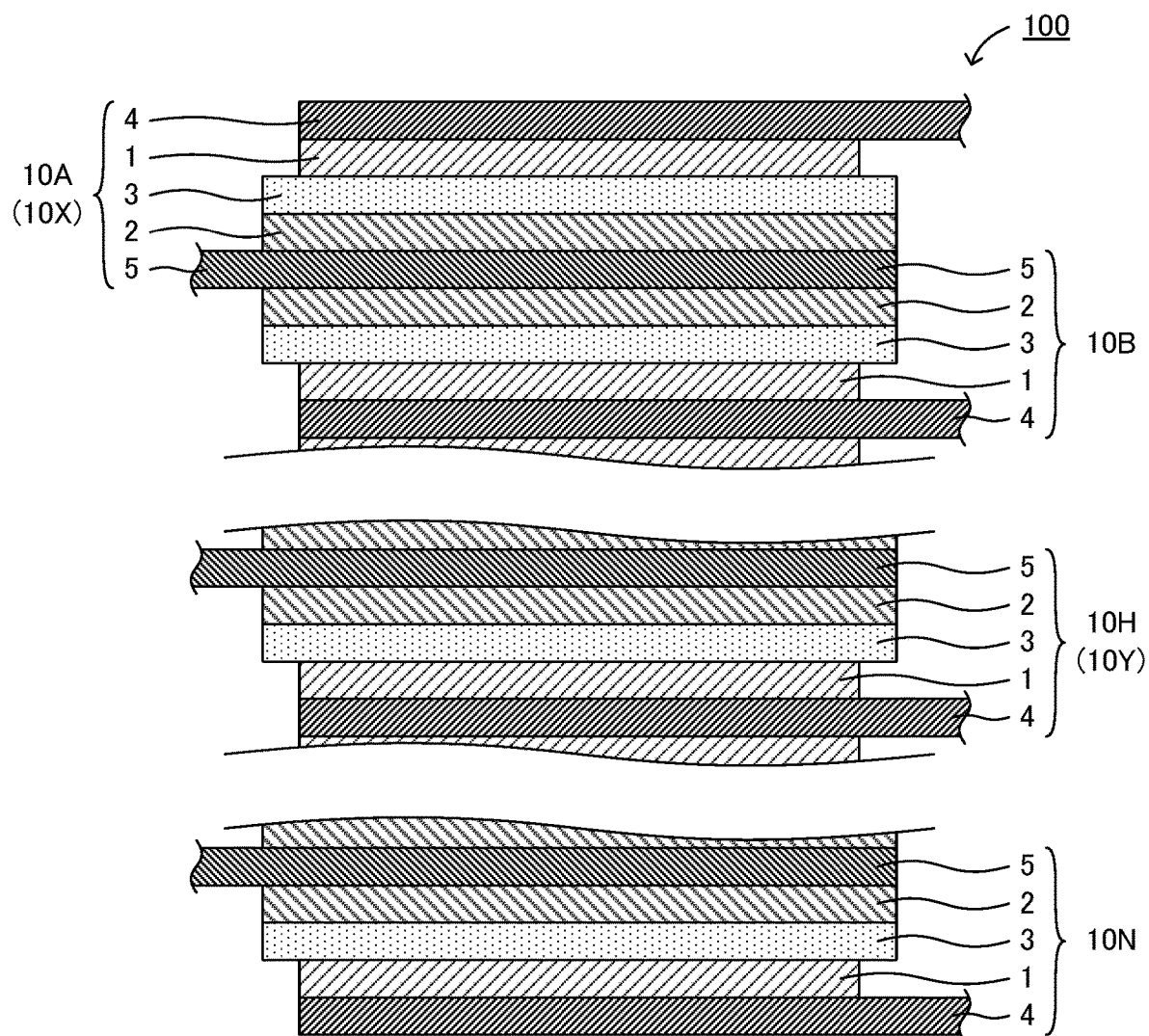
FIG. 1 is a schematic cross-sectional view showing an example of the stacked battery of the present disclosure.

The stacked battery of the present disclosure will be hereinafter described in detail. FIG. 1 is a schematic cross-sectional view showing an example of the stacked battery of the present disclosure. Stacked battery 100 shown in FIG. 1 comprises plurality of cells 10 (10A, 10B to 10H to 10N) in a thickness direction; and each of plurality of cells 10 includes cathode current collector 4, cathode active material layer 1, solid electrolyte layer 3, anode active material layer 2, and anode current collector 5, in this order. Further, plurality of cells 10 are electrically connected in parallel. A method for connecting the cells in parallel is not particularly limited, and for example, cell 10A and cell 10B shown in FIG. 1 are connected in parallel in a manner that the cells share anode current collector 5. Incidentally, two cells next to each other may or may not share cathode current collector 4 or anode current collector 5. In the latter case, for example, by providing two-layered cathode current collector 4 or two-layered anode current collector 5, the two cells next to each other have cathode current collector 4 or anode current collector 5 individually between the cells.

Also, stacked battery 100 includes surface-side cell 10X that is located on a surface side of stacked battery 100, and center-side cell 10Y that is located on a center side rather than surface-side cell 10X. Further, surface-side cell 10X and center-side cell 10Y feature a configuration they satisfy at least one of:

condition i) an elongation rate of cathode current collector 4 in surface-side cell 10X is less than an elongation rate of cathode current collector 4 in center-side cell 10Y; and condition ii) an elongation rate of anode current collector 5 in surface-side cell 10X is less than an elongation rate of anode current collector 5 in center-side cell 10Y.

According to the present disclosure, since the surface-side cell and the center-side cell satisfy at least one of condition i) and condition ii), the unevenness of short circuit resistance among the plurality of cells may be suppressed in the stacked battery. As described above, from detailed studies of the nail penetration test of stacked batteries comprising a plurality of cells electrically connected in parallel, the present inventors have acquired new knowledge that the resistance of a short circuit part (short circuit resistance) in each cell varies greatly with the cell location.

Figure 2:
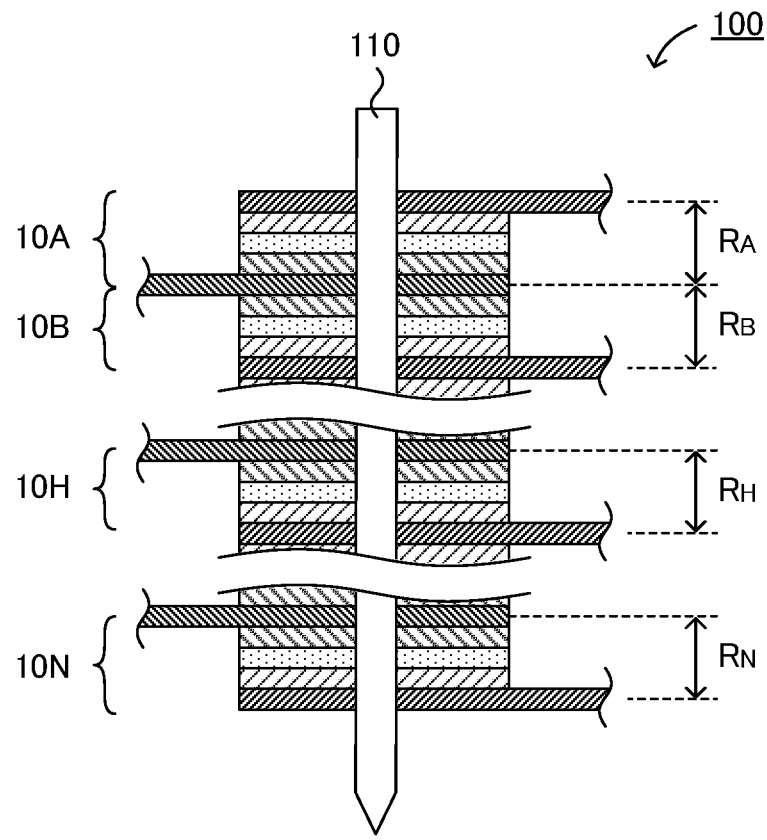
FIG. 2 is a schematic cross-sectional view explaining a nail penetration test.
Figure 3:
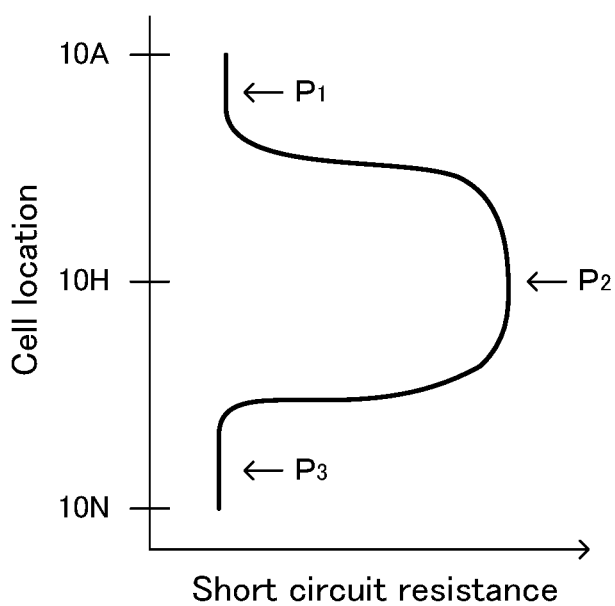
FIG. 3 is a graph showing the relationship between the cell location and the short circuit resistance.

This new knowledge will be explained referring to FIG. 2. As shown in FIG. 2, nail 110 is penetrated into stacked battery 100 comprising plurality of cells 10 (10A, 10B to 10H to 10N) electrically connected in parallel. On this occasion, short circuit resistance R ($R_A$, $R_B$ to $R_H$ to $R_N$) is determined with respect to each cell 10. As the result of such detailed studies, as shown in FIG. 3 for example, it was found out that cell 10A located on the surface side has lower short circuit resistance compared to cell 10H located on the center side. In other words, it was found out that there was the unevenness of short circuit resistance among the plurality of cells.

Figure 4:
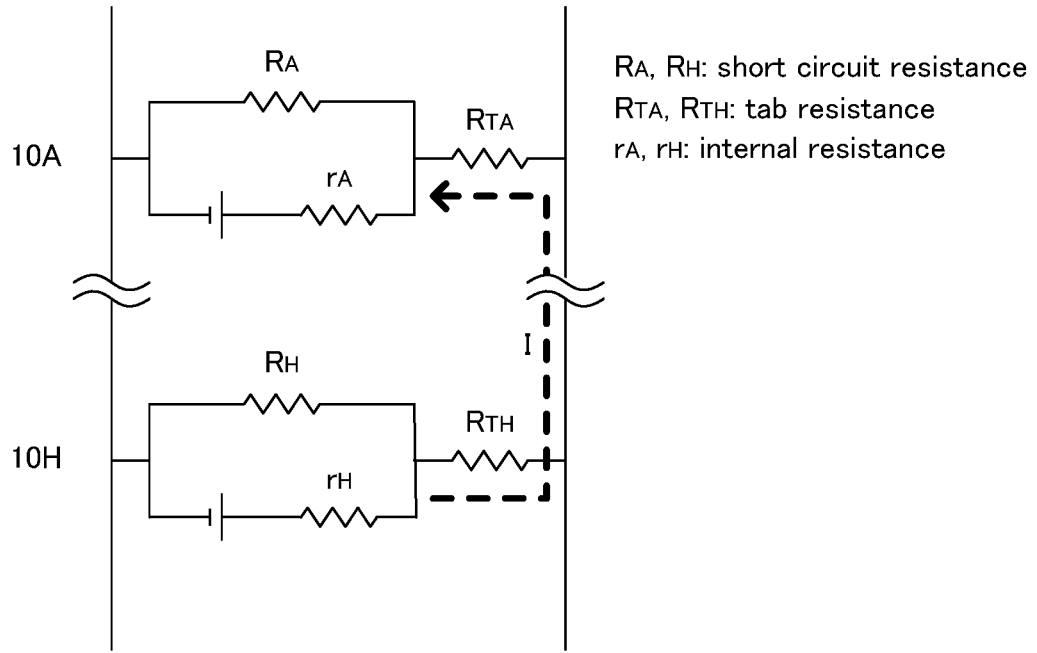
FIG. 4 is an equivalent circuit explaining a sneak current.

When a cell with low short circuit resistance and a cell with high short circuit resistance are mixed, a current flows from the cell with high short circuit resistance into the cell with low short circuit resistance. As shown in FIG. 4 for example, when a short circuit occurs within a stacked battery comprising cell 10A and cell 10H electrically connected in parallel in which short circuit resistance $R_A$ of cell 10A is lower than short circuit resistance $R_H$ of cell 10H, sneak current I flowing from cell 10H into cell 10A occurs in accordance with Ohm's law. When sneak current I occurs, the temperature of cell 10A rises due to Joule heating; as the result, the deterioration of the battery material easily occurs.

Figure 5:
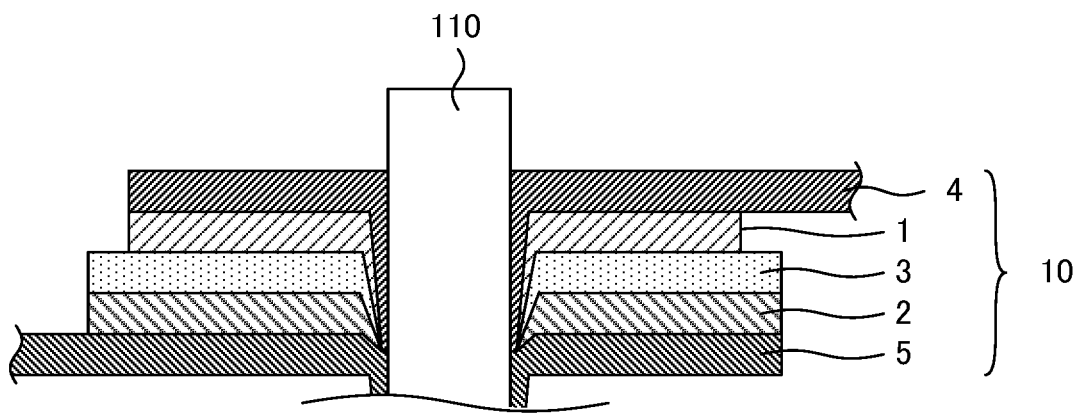
FIG. 5 is a schematic cross-sectional view explaining a nail penetration test.

Although the reason why the unevenness of short circuit resistance exists among the plurality of cells is not completely clear, it is presumed as follows. As shown in FIG. 5 for example, on the surface side (such as location $P_1$ in FIG. 3) of the stacked battery, by penetrating nail 110 into cell 10, a state in which cathode current collector 4 and anode current collector 5 are in contact, and a state in which cathode active material layer 1 and anode current collector 5 are in contact, are presumed to occur.

Meanwhile, on the center side (such as location $P_2$ in FIG. 3) of the stacked battery, since the nail proceeds while dragging the fragment of each member, a state in which the cathode current collector and the anode current collector are not in contact, and a state in which the cathode active material layer and the anode current collector are not in contact, are presumed to occur. For the "state not in contact", for example, the following states may be supposed: a state in which the fragment of the solid electrolyte layer exists between the two, and a state in which a void exists between the two. As the result, the short circuit resistance will be higher on the center side of the stacked battery.

Incidentally, the behavior of the short circuit resistance on the surface side that is opposite to the nail penetrating surface (such as location $P_3$ in FIG. 3) of the stacked battery may possibly vary with the constitution of the stacked battery; however, in both of the later described Reference Examples 1 and 2, the short circuit resistance was lowered. The reason therefor is presumed that, since the nail proceeds while dragging the larger amount of the fragment of each member, the cathode current collector and the anode current collector will be in a state electrically connected by the fragment with high electron conductivity.

In contrast, in the present disclosure, since the surface-side cell and the center-side cell satisfy at least one of condition i) and condition ii), the unevenness of short circuit resistance among the plurality of cells may be suppressed in the stacked battery. Generally, a current collector with a low elongation rate is not easily deformed upon a nail penetration, and a current collector with a high elongation rate is easily deformed upon a nail penetration. Therefore, by using a current collector with a relatively low elongation rate for the surface-side cell with low short circuit resistance, and using a current collector with a relatively high elongation rate for the center-side cell with high short circuit resistance, the unevenness of short circuit resistance among the plurality of cells may be suppressed. Incidentally, in the present disclosure, an inclusive term of merely "current collector" may be used for a cathode current collector and an anode current collector.

Also, the problem of suppressing the unevenness of short circuit resistance among the plurality of cells is a problem never occurs in a single cell, that is, a problem peculiar to a stacked battery. Further, in a typical all-solid-type stack battery, since all of the constituting members are solids, a pressure applied to the stacked battery during a nail penetration test will be extremely high. Since a high pressure such as 100 MPa or more at the part where the nail penetrates, and particularly, 400 MPa or more at the tip part of the nail, is applied, the management of the short circuit resistance in a high pressure condition is important. In contrast, in a liquid-based battery, since a void into where the liquid electrolyte penetrates exists in the electrode, a pressure applied to the battery during a nail penetration test will be greatly lower. That is, it is difficult to conceive of managing the short circuit resistance in a high pressure condition, based on the technique of the liquid-based battery.

1. Elongation Rate of Current Collector

The stacked battery of the present disclosure includes a surface-side cell that is located on a surface side of the stacked battery, and a center-side cell that is located on a center side rather than the surface-side cell. Further, the surface-side cell and the center-side cell satisfy at least one of: condition i) an elongation rate of the cathode current collector in the surface-side cell is less than an elongation rate of the cathode current collector in the center-side cell; and condition ii) an elongation rate of the anode current collector in the surface-side cell is less than an elongation rate of the anode current collector in the center-side cell.

The stacked battery of the present disclosure usually satisfies at least one condition of: including two kinds or more of the cathode current collectors with a different elongation rate, and including two kinds or more of the anode current collectors with a different elongation rate. Here, "surface-side cell" and "center-side cell" in the present disclosure are stipulations for specifying the current collectors with a different elongation rate. For example, an assumed case is a stacked battery including two kinds of the cathode current collectors (cathode current collector α and cathode current collector β) with a different elongation rate. Incidentally, the elongation rates are cathode current collector α<cathode current collector β. When a plurality of cells including the cathode current collector α exist on the surface side of the stacked battery, any one of the plurality of cells may be specified as the surface-side cell. Meanwhile, when a plurality of cells including the cathode current collector β exist on the center side of the stacked battery, any one of the plurality of cells may be specified as the center-side cell. Also, for example, when the stacked battery includes three kinds or more of the cathode current collectors with a different elongation rate, comparing two cathode current collectors with a different elongation rate among them, when the magnitude relation of the elongation rates and the locational relation of the two cathode current collectors (cells) satisfy the specific conditions, the cell including one cathode current collector is specified as the surface-side cell, and the cell including the other cathode current collector is specified as the center-side cell. Incidentally, although the explanation was made exemplifying the cathode current collector, it is much the same for the anode current collector.

When the elongation rate of the cathode current collector in the surface-side cell is regarded as $E_1$ and the elongation rate of the cathode current collector in the center-side cell is regarded as $E_2$, the value of $E_2/E_1$ is, for example, 1.1 or more, and may be 1.7 or more. Meanwhile, the value of $E_2/E_1$ is, for example, 10 or less. Similarly, when the elongation rate of the anode current collector in the surface-side cell is regarded as $E_3$ and the elongation rate of the anode current collector in the center-side cell is regarded as $E_4$, a preferable range of $E_4/E_3$ is similar to that of $E_2/E_1$. The elongation rate of the cathode current collector and the anode current collector may be obtained by measuring a breaking elongation according to JIS 2201.

In the present disclosure, the elongation rate of the cathode current collector in the surface-side cell is preferably less than the elongation rate of the cathode current collector in the center-side cell. Similarly, in the present disclosure, the elongation rate of the anode current collector in the surface-side cell is preferably less than the elongation rate of the anode current collector in the center-side cell. The elongation rate of the current collectors may be adjusted, for example, by the properties of the current collector.

The material for the cathode current collector in the surface-side cell may be a material with lower elongation rate than that of the material for the cathode current collector in the center-side cell. Similarly, the material for the anode current collector in the surface-side cell may be a material with lower elongation rate than that of the material for the anode current collector in the center-side cell. When materials for the current collectors are different, the elongation rates will be different. For example, the elongation rate of SUS is less than the elongation rate of Al. In the surface-side cell and the center-side cell, the cathode current collectors may contain the same material, and the anode current collectors may contain different materials, also, the cathode current collectors may contain different materials, and the anode current collectors may contain the same material.

The thickness of the cathode current collector in the surface-side cell may be less than the thickness of the cathode current collector in the center-side cell. Similarly, the thickness of the anode current collector in the surface-side cell may be less than the thickness of the anode current collector in the center-side cell. When the thickness is larger, the elongation rate tends to be higher. Further, the cathode current collector in the surface-side cell and the cathode current collector in the center-side cell may contain the same material (such as Al) whereas the thicknesses thereof are different. Similarly, the anode current collector in the surface-side cell and the anode current collector in the center-side cell may contain the same material (such as Cu) whereas the thicknesses thereof are different. The thickness difference is, for example, 5 μm or more.

2. Constitution of Stacked Battery

Each of the plurality of cells included in the stacked battery of the present disclosure is numbered as a $1^{st}$ cell to a $N^{th}$ cell in order along the thickness direction of the stacked battery. N refers to the total cell number included in the stacked battery; for example, N is 3 or more, may be 10 or more, may be 30 or more, and may be 50 or more. Meanwhile, N is, for example, 200 or less, may be 150 or less, and may be 100 or less.

The surface-side cell is preferably a cell that belongs to a cell region including the $1^{st}$ cell to a $(N/3)^{th}$ cell. Here, the $(N/3)^{th}$ cell is a cell whose order corresponds to a value obtained by dividing the total cell number N by three. For example, when the total cell number is 60, the $(N/3)^{th}$ cell is a $20^{th}$ cell. Incidentally, when the (N/3) is not an integer, the $(N/3)^{th}$ cell is specified by rounding off to the nearest integer. Also, the surface-side cell may be, for example, a cell that belongs to a cell region including the $1^{st}$ cell to the $20^{th}$ cell, and may be a cell that belongs to a cell region including the $1^{st}$ cell to a $10^{th}$ cell.

Also, the surface-side cell may be, for example, a cell that belongs to a cell region including a $5^{th}$ cell to the $(N/3)^{th}$ cell, and may be a cell that belongs to a cell region including the $10^{th}$ cell to the $(N/3)^{th}$ cell. As mentioned in the later described Reference Examples 1 and 2, due to the influence of an exterior package such as a laminate film, the short circuit resistance of the $1^{st}$ cell during a nail penetration may be high in some cases. Therefore, the surface-side cell may be specified, excluding the $1^{st}$ cell and the neighborhood cells.

Meanwhile, the center-side cell is a cell that is located on the center side rather than the surface-side cell. "Center side" refers to the central side in the thickness direction of the stacked cells. The center-side cell is preferably a cell that belongs to a cell region including a $((N/3)+1)^{th}$ cell to a $(2N/3)^{th}$ cell. Here, the $((N/3)+1)^{th}$ cell refers to a cell next to the $(N/3)^{th}$ cell when numbered from the $1^{st}$ cell. Meanwhile, the $(2N/3)^{th}$ cell is a cell whose order corresponds to a value obtained by dividing the doubled value of the total cell number N by three. For example, when the total cell number is 60, the $(2N/3)^{th}$ cell is a $40^{th}$ cell. Incidentally, when the $(2N/3)$ is not an integer, the $(2N/3)^{th}$ cell is specified by rounding off to the nearest integer. Also, the center-side cell may be, for example, a cell that belongs to a cell region including the $21^{st}$ cell to the $40^{th}$ cell.

Also, a cell region including the $1^{st}$ cell to the $(N/3)^{th}$ cell is regarded as a cell region A, and a cell region including the $((N/3)+1)^{th}$ cell to the $(2N/3)^{th}$ cell is regarded as a cell region B. The average elongation rate $E_{AC}$ of the cathode current collector in the cell region A is preferably less than the average elongation rate $E_{BC}$ of the cathode current collector in the cell region B. The value of $E_{BC}/E_{AC}$ is, for example, 1.1 or more, and may be 1.7 or more. Meanwhile, the value of $E_{BC}/E_{AC}$ is, for example, 10 or less. Similarly, the average elongation rate $E_{AA}$ of the anode current collector in the cell region A is preferably less than the average elongation rate $E_{BA}$ of the anode current collector in the cell region B. The preferable range of $E_{BA}/E_{AA}$ is similar to that of $E_{BC}/E_{AC}$.

Also, a cell region including the $1^{st}$ cell to the $20^{th}$ cell is regarded as a cell region C, and a cell region including the $21^{st}$ cell to the $40^{th}$ cell is regarded as a cell region D. The average elongation rate $E_{CC}$ of the cathode current collector in the cell region C is preferably less than the average elongation rate $E_{DC}$ of the cathode current collector in the cell region D. The value of $E_{DC}/E_{CC}$ is, for example, 1.1 or more, and may be 1.7 or more. Meanwhile, the value of $E_{DC}/E_{CC}$ is, for example, 10 or less. Similarly, the average elongation rate $E_{CA}$ of the anode current collector in the cell region C is preferably less than the average elongation rate $E_{DA}$ of the anode current collector in the cell region D. The preferable range of $E_{DA}/E_{CA}$ is similar to that of $E_{DC}/E_{CC}$.

Also, in the stacked battery after a nail penetration test, the short circuit resistance of the cell with the lowest short circuit resistance is regarded as $R_{Min}$, and the short circuit resistance of the cell with the highest short circuit resistance is regarded as $R_{Max}$. For example, when a metal active material (particularly Si or an Si alloy) is used as the anode active material, the value of $R_{Max}/R_{Min}$ is preferably 100 or less, and more preferably 5.0 or less. Incidentally, the nail penetration test is carried out under conditions mentioned in the later described Reference Examples 1 and 2.

3. Cell

The cell in the present disclosure includes a cathode current collector, a cathode active material layer, a solid electrolyte layer, an anode active material layer, and an anode current collector, in this order. The cell is typically a cell utilizing Li ion conductivity (a Li ion cell). Also, the cell is preferably a cell capable of being charged and discharged (a secondary battery).

(1) Anode Active Material Layer

The anode active material layer includes at least an anode active material, and may include at least one of a solid electrolyte material, a conductive material, and a binder as required.

The anode active material is not particularly limited, and examples thereof may include a metal active material, a carbon active material, and an oxide active material. Examples of the metal active material may include a simple substance of metal and a metal alloy. Examples of the metal element included in the metal active material may include Si, Sn, In, and Al. The metal alloy is preferably an alloy including the above described metal element as the main component. Examples of the Si alloy may include a Si—Al base alloy, a Si—Sn base alloy, a Si—In base alloy, a Si—Ag base alloy, a Si—Pb base alloy, a Si—Sb base alloy, a Si—Bi base alloy, a Si—Mg base alloy, a Si—Ca base alloy, a Si—Ge base alloy, and a Si—Pb base alloy. Incidentally, the Si—Al based alloy, for example, refers to an alloy including at least Si and Al, may be an alloy including only Si and Al, and may be an alloy further including an additional metal element. It is much the same for the alloys other than the Si—Al based alloy. The metal alloy may be a two-component based alloy, and may be a multicomponent based alloy including three or more components.

Meanwhile, examples of the carbon active material may include a mesocarbon microbead (MCMB), a highly oriented pyrolytic graphite (HOPG), a hard carbon, and a soft carbon. Also, examples of the oxide active material may include a lithium titanate such as $Li_4Ti_5O_{12}$.

Examples of the shape of the anode active material may include a granular shape. The average particle size ($D_{50}$) of the anode active material is, for example, within a range of 10 nm to 50 μm, and may be within a range of 100 nm to 20 μm. The proportion of the anode active material in the anode active material layer is, for example, 50% by weight or more, and may be within a range of 60% by weight to 99% by weight.

The solid electrolyte material is not particularly limited, and examples thereof may include an inorganic solid electrolyte material such as a sulfide solid electrolyte material, and an oxide solid electrolyte material. Examples of the sulfide solid electrolyte material may include $Li_2S$—$P_2S_5$, $Li_2S$—$P_2S_5$—LiI, $Li_2S$—$P_2S_5$—LiI—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (wherein m and n are respectively a positive number; Z is any one of Ge, Zn, and Ga.), $Li_2S$—$GeS_2$, $Li_2S$—$SiS_2$—$Li_3PO_4$, $Li_2S$—$SiS_2$—$Li_xMO_y$ (wherein x and y are respectively a positive number; M is any one of P, Si, Ge, B, Al, Ga, and In.) Incidentally, the above described "$Li_2S$—$P_2S_5$" refers to a sulfide solid electrolyte material using a raw material composition including $Li_2S$ and $P_2S_5$, and it is much the same for other descriptions.

In particular, the sulfide solid electrolyte material is preferably provided with an ion conductor including Li, A (A is at least one kind of P, Si, Ge, Al, and B), and S. Further, the ion conductor preferably includes an anion structure ($PS_4^{3-}$ structure, $SiS_4^{4-}$ structure, $GeS_4^{4-}$ structure, $AlS_3^{3-}$ structure, $BS_3^{3-}$ structure) of an ortho-composition, as the main component of an anion. The reason therefor is to obtain a sulfide solid electrolyte material with high chemical stability. The proportion of the anion structure of the ortho-composition among the total anion structures in the ion conductor is preferably 70 mol % or more, and more preferably 90 mol % or more. The proportion of the anion structure of the ortho-composition may be determined by, for example, a Raman spectroscopy, a NMR, and an XPS.

In addition to the ion conductor, the sulfide solid electrolyte material may include a lithium halide. Examples of the lithium halide may include LiF, LiCl, LiBr, and LiI, and among them, LiCl, LiBr, and LiI are preferable. The proportion of LiX (X=I, Cl, Br) in the sulfide solid electrolyte material is, for example, within a range of 5 mol % to 30 mol %, and may be within a range of 15 mol % to 25 mol %.

The solid electrolyte material may be a crystalline material, and may be an amorphous material. Also, the solid electrolyte material may be a glass, and may be a crystallized class (a glass ceramic). Examples of the shape of the solid electrolyte material may include a granular shape.

Examples of the conductive material may include carbon materials such as acetylene black (AB), Ketjen black (KB), carbon fiber, carbon nanotube (CNT), and carbon nanofiber (CNF). Also, examples of the binder may include rubber based binders such as butylene rubber (BR), styrene-butadiene rubber (SBR); and fluoride based binders such as polyvinylidene fluoride (PVDF).

The thickness of the anode active material layer is, for example, within a range of 0.1 μm to 300 μm, and may be within a range of 0.1 μm to 100 μm.

(2) Cathode Active Material Layer

The cathode active material layer includes at least a cathode active material, and may include at least one of a solid electrolyte material, a conductive material, and a binder as required.

The cathode active material is not particularly limited, and examples thereof may include an oxide active material. Examples of the oxide active material may include a rock salt bed type active material such as $LiCoO_2$, $LiMnO_2$, $LiNiO_2$, $LiVO_2$, and $LiNi_{1/3}Co_{1/3}Mn_{1/3}O_2$; a spinel type active material such as $LiMn_2O_4$, $Li_4Ti_5O_{12}$, and $Li(Ni_{0.5}Mn_{1.5})O_4$; and an olivine type active material such as $LiFePO_4$, $LiMnPO_4$, $LiNiPO_4$, and $LiCoPO_4$. Also, as the oxide active material, for example, a LiMn spinel active material represented by $Li_{1+x}Mn_{2-x-y}M_yO_4$ (M is at least one kind of Al, Mg, Co, Fe, Ni, and Zn, and $0<x+y<2$), and a lithium titanate may be used.

Also, on a surface of the cathode active material, a coating layer including a Li ion conductive oxide may be formed. The reason therefore is to suppress the reaction between the cathode active material and the solid electrolyte material. Examples of the Li ion conductive oxide may include $LiNbO_3$, $Li_4Ti_5O_{12}$, and $Li_3PO_4$. The thickness of the coating layer is, for example, within a range of 0.1 nm to 100 nm, and may be within a range of 1 nm to 20 nm. The coverage of the coating layer on the cathode active material surface is, for example, 50% or more, and may be 80% or more.

The solid electrolyte material, the conductive material, and the binder used for the cathode active material layer are respectively in the same contents as those described in "(1) Anode active material layer" above; thus, the descriptions herein are omitted. Also, the thickness of the cathode active material layer is, for example, within a range of 0.1 μm to 300 μm, and may be within a range of 0.1 μm to 100 μm.

(3) Solid Electrolyte Layer

The solid electrolyte layer is a layer formed between the cathode active material layer and the anode current collector. Also, the solid electrolyte layer includes at least a solid electrolyte material, and may further include a binder as required. The solid electrolyte material and the binder used for the solid electrolyte layer are respectively in the same contents as those described in "(1) Anode active material layer" above; thus, the descriptions herein are omitted.

The content of the solid electrolyte material in the solid electrolyte layer is, for example, within a range of 10% by weight to 100% by weight, and may be within a range of 50% by weight to 100% by weight. Also, the thickness of the solid electrolyte layer is, for example, within a range of 0.1 μm to 300 μm, and may be within a range of 0.1 μm to 100 μm.

(4) Cathode Current Collector and Anode Current Collector

The cathode current collector collects currents of the above described cathode active material layer, and the anode current collector collects currents of the above described anode active material layer. The metal element included in the cathode current collector is not particularly limited, and examples thereof may include Al, Fe, Ti, Ni, Zn, Cr, Au, and Pt. The cathode current collector may be a simple substance of the metal element, and may be an alloy including the metal element as the main component. Stainless steel (SUS) is an example of the Fe alloy, and SUS304 is preferable.

Examples of the shape of the cathode current collector may include a foil shape and a mesh shape. The thickness of the cathode current collector is, for example, 0.1 μm or more, and may be 1 μm or more. When the cathode current collector is too thin, the current collecting function may be degraded. Meanwhile, the thickness of the cathode current collector is, for example, 1 mm or less, and may be 100 μm or less. When the cathode current collector is too thick, the energy density of a battery may be degraded.

The metal element included in the anode current collector is not particularly limited, and examples thereof may include Cu, Fe, Ti, Ni, Zn, and Co. The anode current collector may be a simple substance of the metal element, and may be an alloy including the metal element as the main component. Stainless steel (SUS) is an example of the Fe alloy, and SUS304 is preferable.

Examples of the shape of the anode current collector may include a foil shape and a mesh shape. The thickness of the anode current collector is, for example, 0.1 μm or more, and may be 1 μm or more. When the anode current collector is too thin, the current collecting function may be degraded. Meanwhile, the thickness of the anode current collector is, for example, 1 mm or less, and may be 100 μm or less. When the anode current collector is too thick, the energy density of a battery may be degraded.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure will be described in more details. First, in each of Reference Examples 1 and 2, it was confirmed that the unevenness of short circuit resistance among a plurality of cells in a conventional stacked battery was large.

Reference Example 1

Production of Cathode

Using a tumbling fluidized bed granulating-coating machine (manufactured by Powrex Corp.), the cathode active material ($Li_{1.15}Ni_{1/3}Co_{1/3}Mn_{1/3}W_{0.005}O_2$) was coated with $LiNbO_3$ in the atmospheric environment. After that, by burning thereof in the atmospheric environment, a coating layer including $LiNbO_3$ was formed on the surface of the cathode active material. Thereby, a cathode active material having the coating layer on the surface thereof was obtained.

Next, butyl butyrate, 5% by weight butyl butyrate solution of a PVDF based binder (manufactured by Kureha Corp.), the obtained cathode active material, a sulfide solid electrolyte material ($Li_2S$—$P_2S_5$ based glass ceramic including LiI and LiBr, average particle size $D_{50}$=0.8 μm), and a conductive material (a vapor-grown carbon fiber, VGCF, manufactured by Showa Denko K. K.) were added into a propylene (PP) container so as to be cathode active material:sulfide solid electrolyte material:conductive material:binder=85:13:1:1 in the weight ratio. Next, the PP container was stirred for 30 seconds by an ultrasonic dispersion apparatus (UH-50, manufactured by SMT Corp.) Next, the PP container was agitated for 3 minutes by an agitation mixer (TTM-1, manufactured by Sibata Scientific Technology LTD.), and further, was stirred for 30 seconds by the ultrasonic dispersion apparatus to obtain a coating solution.

Next, an Al foil (manufactured by Nippon Foil Mfg. Co. Ltd., a cathode current collector) was prepared. The obtained coating solution was pasted on the Al foil by a blade method using an applicator. The coated electrode was dried naturally, and then, was dried at 100° C. for 30 minutes on a hot plate to form a cathode active material layer on one surface of the cathode current collector. Next, the obtained product was cut according to the size of the battery to obtain a cathode.

Production of Anode

Butyl butyrate, 5% by weight butyl butyrate solution of a PVDF based binder (manufactured by Kureha Corp.), an anode active material (silicon, manufactured by Kojundo Chemical Lab. Co., Ltd., average particle size $D_{50}$=5 μm), a sulfide solid electrolyte material ($Li_2S$—$P_2S_5$ based glass ceramic including LiI and LiBr, average particle size $D_{50}$=0.8 μm), and a conductive material (a vapor-grown carbon fiber, VGCF, manufactured by Showa Denko K. K.) were added into a PP container so as to be anode active material:sulfide solid electrolyte material:conductive material:binder=55:42:2:1 in the weight ratio. Next, the PP container was stirred for 30 seconds by an ultrasonic dispersion apparatus (UH-50, manufactured by SMT Corp.). Next, the PP container was agitated for 30 minutes by an agitation mixer (TTM-1, manufactured by Sibata Scientific Technology LTD.), and further, was stirred for 30 seconds by the ultrasonic dispersion apparatus to obtain a coating solution.

Figure 6A:
FIGS. 6A to 6E are schematic cross-sectional views exemplifying a method for producing a two-stacked cell.
Figure 6B:
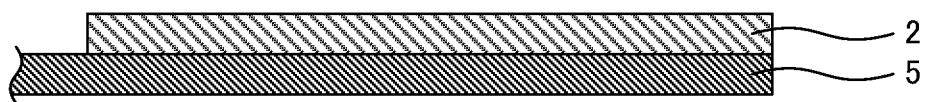
Figure 6C:

Next, as shown in FIG. 6A, a Cu foil (anode current collector 5) was prepared. The obtained coating solution was pasted on the Cu foil by a blade method using an applicator. The coated electrode was dried naturally, and then, was dried at 100° C. for 30 minutes on a hot plate. Thereby, as shown in FIG. 6B, anode active material layer 2 was formed on one surface of the Cu foil (anode current collector 5). After that, by the similar treatment, anode active material layer 2 was formed on another surface of the Cu foil (anode current collector 5) as shown in FIG. 6C. Next, the obtained product was cut according to the size of the battery to obtain an anode.

Production of Solid Electrolyte Layer

Heptane, 5% by weight heptane solution of a butylene rubber based binder (manufactured by JSR Corp.), and a sulfide solid electrolyte material ($Li_2S$—$P_2S_5$ based glass ceramic including LiI and LiBr, average particle size $D_{50}$=2.5 μm) were added into a PP container. Next, the PP container was stirred for 30 seconds by an ultrasonic dispersion apparatus (UH-50, manufactured by SMT Corp.). Next, the PP container was agitated for 30 minutes by an agitation mixer (TTM-1, manufactured by Sibata Scientific Technology LTD.), and further, was stirred for 30 seconds by the ultrasonic dispersion apparatus to obtain a coating solution.

Next, an Al foil (manufactured by Nippon Foil Mfg. Co. Ltd.) was prepared. The obtained coating solution was pasted on the Al foil by a blade method using an applicator. The coated electrode was dried naturally, and then, was dried at 100° C. for 30 minutes on a hot plate. Next, the obtained product was cut according to the size of the battery to obtain a transfer member including the Al foil and the solid electrolyte layer.

Production of Evaluation Battery

Figure 6D:
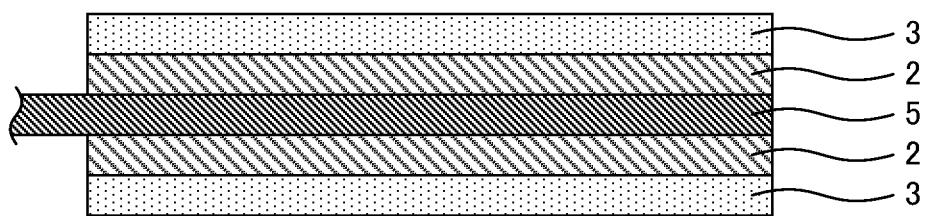
Figure 6E:
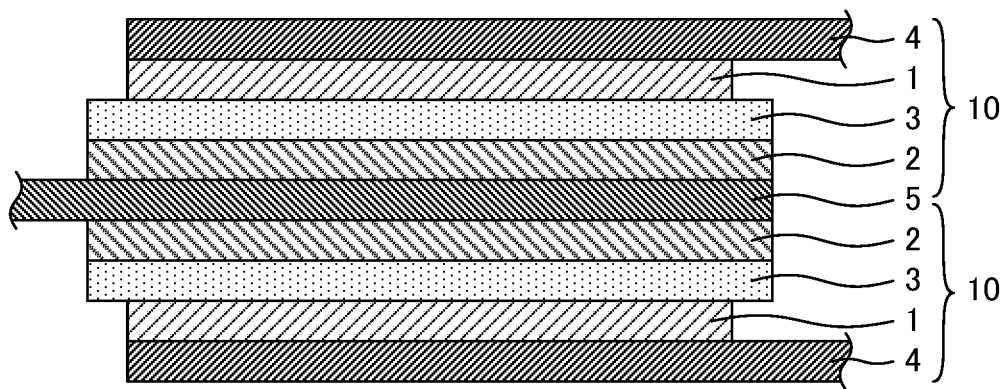

Each of the two obtained transfer members was placed on the anode active material layers formed on the both sides of the anode current collector, and the product was pressed under the pressure of 4 ton/cm² by a cold isostatic pressing method (CIP method). After that, the Al foils of the transfer members were peeled off. Thereby, as shown in FIG. 6D, solid electrolyte layers 3 were formed on anode active material layers 2. Next, each of the two above obtained cathodes was placed on the solid electrolyte layers formed on the both sides of the anode current collectors, and the product was pressed under the pressure of 4 ton/cm² by the cold isostatic pressing method (CIP method). Thereby, as shown in FIG. 6E, cathode active material layers 1 and cathode current collectors 4 were formed on solid electrolyte layers 3. As described above, a two-stacked cell was obtained. Further, 30 of the obtained two-stacked cells were stacked, and the obtained product was sealed with an aluminum laminate film to obtain an evaluation battery.

Reference Example 2

Production of Anode

Butyl butyrate, 5% by weight butyl butyrate solution of a PVDF based binder (manufactured by Kureha Corp.), an anode active material (natural graphite, manufactured by Nippon Carbon Co., Ltd., average particle size $D_{50}$=10 μm), and a sulfide solid electrolyte material ($Li_2S$—$P_2S_5$ based glass ceramic including LiI and LiBr, average particle size $D_{50}$=0.8 μm) were added into a PP container so as to be anode active material:sulfide solid electrolyte material:binder=59:40:1 in the weight ratio. Next, the PP container was stirred for 30 seconds by an ultrasonic dispersion apparatus (UH-50, manufactured by SMT Corp.) Next, the PP container was agitated for 30 minutes by an agitation mixer (TTM-1, manufactured by Sibata Scientific Technology LTD.), and further, was stirred for 30 seconds by the ultrasonic dispersion apparatus to obtain a coating solution.

Production of Evaluation Battery

A two-stacked cell was obtained in the same manner as in Reference Example 1 except that the obtained coating solution was used. Further, an evaluation battery was obtained in the same manner as in Reference Example 1 except that 40 of the obtained two-stacked cells were stacked.

[Evaluation]

A nail penetration test was conducted for each evaluation battery obtained in Reference Examples 1 and 2 under the following conditions.

Figure 7:
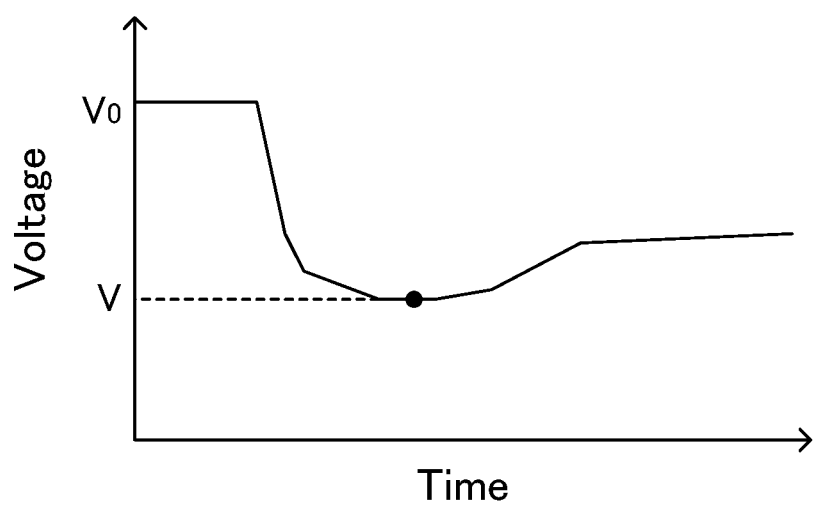
FIG. 7 is a graph exemplifying a voltage profile in a nail penetration test.

Charging status: uncharged
Resistance meter: RM3542 manufactured by Hioki E. E. Corp.
Nail: SK (carbon tool steel) material ($\phi$: 8 mm, tip angle: 60°)
Speed of the nail: 25 mm/sec The short circuit resistance of a cell was obtained from a voltage profile upon the nail penetration. An example of the voltage profile is shown in FIG. 7. As shown in FIG. 7, the voltage of the cell decreases by penetrating the nail. Here, the initial voltage is referred to as $V_0$, and the minimum voltage upon the nail penetration is referred to as $V$. Also, the internal resistance of the cell was measured in advance, and the internal resistance is referred to as r. Also, the short circuit resistance of the cell is referred to as R. When presuming that all of the current generated due to the voltage drop upon the nail penetration is the short circuit current, a relationship of $V/R=(V_0-V)/r$ is established. The short circuit resistance R of the cell may be calculated from this relationship. By compiling the voltage profile of each cell, a variation of the short circuit resistance in the thickness direction was confirmed. The results thereof are shown in Table 1 and Table 2. Incidentally, the values of the short circuit resistance in Table 1 and Table 2 are relative values when the short circuit resistance of the $1^{st}$ cell is 1. Also, the cell close to the nail penetration surface was numbered as the $1^{st}$ cell.

TABLE 1

<Si>

| $N^{th}$ cell | Short circuit resistance |
|---|---|
| 1 | 1 |
| 10 | 0.005 |
| 20 | 28859 |
| 30 | 38255 |
| 40 | 671141 |
| 50 | 18121 |
| 60 | 0.026 |

TABLE 2

<C>

| $N^{th}$ cell | Short circuit resistance |
|---|---|
| 1 | 1 |
| 10 | 0.159 |
| 40 | 0.968 |
| 60 | 3.683 |
| 80 | 0.698 |

As shown in Table 1 and Table 2, in both Reference Examples 1 and 2, the short circuit resistance of the $1^{st}$ cell was more than the short circuit resistance of the $10^{th}$ cell. The reason therefor is presumed that upon the nail penetration, the insulating part of the laminate film was dragged in. Also, in Reference Example 1, the short circuit resistance of the $40^{th}$ cell was more compared to the short circuit resistance of the $1^{st}$ cell or the $10^{th}$ cell, and in Reference Example 2, the short circuit resistance of the $60^{th}$ cell was more compared to the short circuit resistance of the $1^{st}$ cell or the $10^{th}$ cell. As described above, the short circuit resistance was less in the surface-side cell, and was more in the center-side cell. Particularly, in Reference Example 1 in which Si was used as the anode active material, the unevenness of the short circuit resistance was extremely large compared to Reference Example 2 in which C was used as the anode active material.

Experimental Example 1

A two-stacked cell was prepared in the same manner as in Reference Example 1 except that an Al foil (15 μm thickness, 1N30 manufactured by UACJ Corp.) was used as a cathode current collector, and a Cu foil (14 μm thickness, electrolytic surface roughened Cu foil manufactured by Furukawa Electric Co., Ltd.) was used as an anode current collector.

Experimental Example 2

A two-stacked cell was prepared in the same manner as in Reference Example 1 except that an Al foil (6 μm thickness, manufactured by Toyo Aluminum K. K.) was used as a cathode current collector.

Experimental Example 3

A two-stacked cell was prepared in the same manner as in Reference Example 1 except that a SUS foil (SUS304, 15 μm thickness, manufactured by Toyo Seihaku Co., Ltd.) was used as a cathode current collector.

[Evaluation]

The nail penetration test was conducted for each two-stacked cell obtained in Experimental Examples 1 to 3 by placing thereof on an Al plate of 3 mm thickness, under the following conditions.

Charging status: uncharged
Resistance meter: RM3542 manufactured by Hioki E. E. Corp.
Nail: SK material ($\phi$: 8 mm, tip angle: 60°)
Speed of the nail: 0.5 mm/sec The short circuit resistance of each cell was obtained from a voltage profile upon the nail penetration. The results thereof are shown in Table 3. Incidentally, the values of the short circuit resistance in Table 3 are relative values when the short circuit resistance in Experimental Example 1 is 100.

TABLE 3

| | Cathode current collector | | Anode current collector | | Short circuit resistance |
|---|---|---|---|---|---|
| | Kind | Elongation rate (%) | Kind | Elongation rate (%) | |
| Experimental Example 1 | Al (15 μm) | 4.5 | Cu (14 μm) | 5.8 | 100 |
| Experimental Example 2 | Al (6 μm) | 2.3 | Cu (14 μm) | 5.8 | 346 |
| Experimental Example 3 | SUS (15 μm) | 1.6 | Cu (14 μm) | 5.8 | 425 |

As shown in Table 3, the short circuit resistance increases in the order of: Experimental Example 1, Experimental Example 2, and Experimental Example 3. The reason therefor is presumed that when the elongation rate of the current collector is higher, the deformation amount upon the nail penetration is larger so that the cathode current collector and the anode current collector come into contact with each other easily. From these results, it was suggested that, by making the elongation rate of the current collector in the surface-side cell relatively low, and by making the elongation rate of the current collector in the center-side cell relatively high, the unevenness of short circuit resistance among a plurality of cells may be suppressed.

REFERENCE SIGNS LIST 1 cathode active material layer
2 anode active material layer
3 solid electrolyte layer
4 cathode current collector
5 anode current collector
10 cell
100 stacked battery
110 nail

What is claimed is:

1. A stacked battery comprising:
a plurality of cells in a thickness direction, wherein
the plurality of cells are electrically connected in parallel;
each of the plurality of cells includes a cathode current collector, a cathode active material layer, a solid electrolyte layer comprising an inorganic solid electrolyte material as a solid electrolyte material, an anode active material layer, and an anode current collector, in this order;
the stacked battery includes a surface-side cell that is located on a surface side of the stacked battery, and a center-side cell that is located on a center side rather than the surface-side cell;
the surface-side cell and the center-side cell satisfy at least one of:
condition i) an elongation rate of the cathode current collector in the surface-side cell is less than an elongation rate of the cathode current collector in the center-side cell; and
condition ii) an elongation rate of the anode current collector in the surface-side cell is less than an elongation rate of the anode current collector in the center-side cell; and
when each of the plurality of cells is numbered as a $1^{st}$ cell to a $N^{th}$ cell, in which $N \geq 10$, in order along the thickness direction of the stacked battery, the surface-side cell is not the $1^{st}$ cell or the $N^{th}$ cell; and
in the condition i) a material for the cathode current collector in the surface-side cell is a material with lower elongation rate than that of a material for the cathode current collector in the center-side cell; and
in condition ii) a material for the anode current collector in the surface-side cell is a material with lower elongation rate than that of a material for the anode current collector in the center-side cell.

2. The stacked battery according to claim 1, wherein, the surface-side cell is a cell that belongs to a cell region A including a $2^{nd}$ cell to a $(N/3)^{th}$ cell.

3. The stacked battery according to claim 2, wherein the center-side cell is a cell that belongs to a cell region B including a $((N/3)+1)^{th}$ cell to a $(2N/3)^{th}$ cell.

4. The stacked battery according to claim 3, wherein an average elongation rate of the cathode current collector in the cell region A is less than an average elongation rate of the cathode current collector in the cell region B.

5. The stacked battery according to claim 3, wherein an average elongation rate of the anode current collector in the cell region A is less than an average elongation rate of the anode current collector in the cell region B.

6. The stacked battery according to claim 1, wherein, when each of the plurality of cells is numbered as a $1^{st}$ cell to a $N^{th}$ cell, in which $N \geq 60$, in order along the thickness direction of the stacked battery, the surface-side cell is a cell that belongs to a cell region C including a $2^{nd}$ cell to a $20^{th}$ cell.

7. The stacked battery according to claim 6, wherein the center-side cell is a cell that belongs to a cell region D including a $21^{st}$ cell to a $40^{th}$ cell.

8. The stacked battery according to claim 7, wherein an average elongation rate of the cathode current collector in the cell region C is less than an average elongation rate of the cathode current collector in the cell region D.

9. The stacked battery according to claim 7, wherein an average elongation rate of the anode current collector in the cell region C is less than an average elongation rate of the anode current collector in the cell region D.

10. The stacked battery according to claim 1, wherein the anode active material layer includes Si or a Si alloy as an anode active material.

* * * * *